US012404628B2

(12) United States Patent
Ito et al.

(10) Patent No.: US 12,404,628 B2
(45) Date of Patent: Sep. 2, 2025

(54) SIZING AGENT FOR INORGANIC FIBERS AND INORGANIC FIBERS

(71) Applicant: Takemoto Oil & Fat Co., Ltd., Gamagori (JP)

(72) Inventors: Jun Ito, Gamagori (JP); Yohei Suzuki, Gamagori (JP); Takuya Matsunaga, Gamagori (JP)

(73) Assignee: Takemoto Oil & Fat Co., Ltd., Gamagori (JP)

( * ) Notice: Subject to any disclaimer, the term of this patent is extended or adjusted under 35 U.S.C. 154(b) by 0 days.

(21) Appl. No.: 18/714,345

(22) PCT Filed: Nov. 29, 2022

(86) PCT No.: PCT/JP2022/044058
§ 371 (c)(1),
(2) Date: May 29, 2024

(87) PCT Pub. No.: WO2023/100901
PCT Pub. Date: Jun. 8, 2023

(65) Prior Publication Data
US 2024/0417917 A1    Dec. 19, 2024

(30) Foreign Application Priority Data
Dec. 2, 2021   (JP) .................. 2021-196189

(51) Int. Cl.
*D06M 15/507* (2006.01)
*C03C 25/26* (2018.01)
(Continued)

(52) U.S. Cl.
CPC ........... *D06M 15/507* (2013.01); *C03C 25/26* (2013.01); *C03C 25/28* (2013.01); *C03C 25/323* (2013.01);
(Continued)

(58) Field of Classification Search
CPC .. D06M 15/507; D06M 15/263; D06M 15/55; D06M 2101/40; D06M 2200/40; C03C 25/26; C03C 25/323; C03C 25/36
(Continued)

(56) References Cited

U.S. PATENT DOCUMENTS

2018/0245246 A1    8/2018  Sinmen et al.
2021/0156079 A1    5/2021  Sakaguchi et al.

FOREIGN PATENT DOCUMENTS

CN    106641578 B    12/2018
FR    2291314    *  6/1976
(Continued)

OTHER PUBLICATIONS

International Search Report and Written Opinion dated Jan. 24, 2023, in connection with International Application No. PCT/JP2022/044058, and English translation thereof.
(Continued)

*Primary Examiner* — Camie S Thompson
(74) *Attorney, Agent, or Firm* — Wolf, Greenfield & Sacks, P.C.

(57) ABSTRACT

Disclosed is an inorganic fiber sizing agent that contains a resin, which includes a vinyl ester resin and an ionic polyester resin, and has a mass ratio of the vinyl ester resin to the ionic polyester resin of greater than 1.

12 Claims, 1 Drawing Sheet

(51) Int. Cl.
  *C03C 25/28*  (2018.01)
  *C03C 25/323*  (2018.01)
  *C03C 25/36*  (2006.01)
  *D06M 15/263*  (2006.01)
  *D06M 15/55*  (2006.01)
  *D06M 101/40*  (2006.01)

(52) U.S. Cl.
  CPC ........... *C03C 25/36* (2013.01); *D06M 15/263* (2013.01); *D06M 15/55* (2013.01); *D06M 2101/40* (2013.01); *D06M 2200/40* (2013.01)

(58) Field of Classification Search
  USPC ........................................................ 428/367
  See application file for complete search history.

(56) References Cited

FOREIGN PATENT DOCUMENTS

| | | | | |
|---|---|---|---|---|
| JP | 2004-263025 A | 9/2004 | | |
| JP | 2011-021281 A | 2/2011 | | |
| JP | 2016-151069 A | 8/2016 | | |
| JP | 2019099942 | * | 6/2019 | |
| WO | WO-2018139158 A1 | * | 8/2018 | ............. C08G 18/66 |
| WO | 2020/027126 A1 | 2/2020 | | |

OTHER PUBLICATIONS

Extended European Search Report dated Jan. 8, 2025, in connection with European Application No. 22901333.9.

* cited by examiner

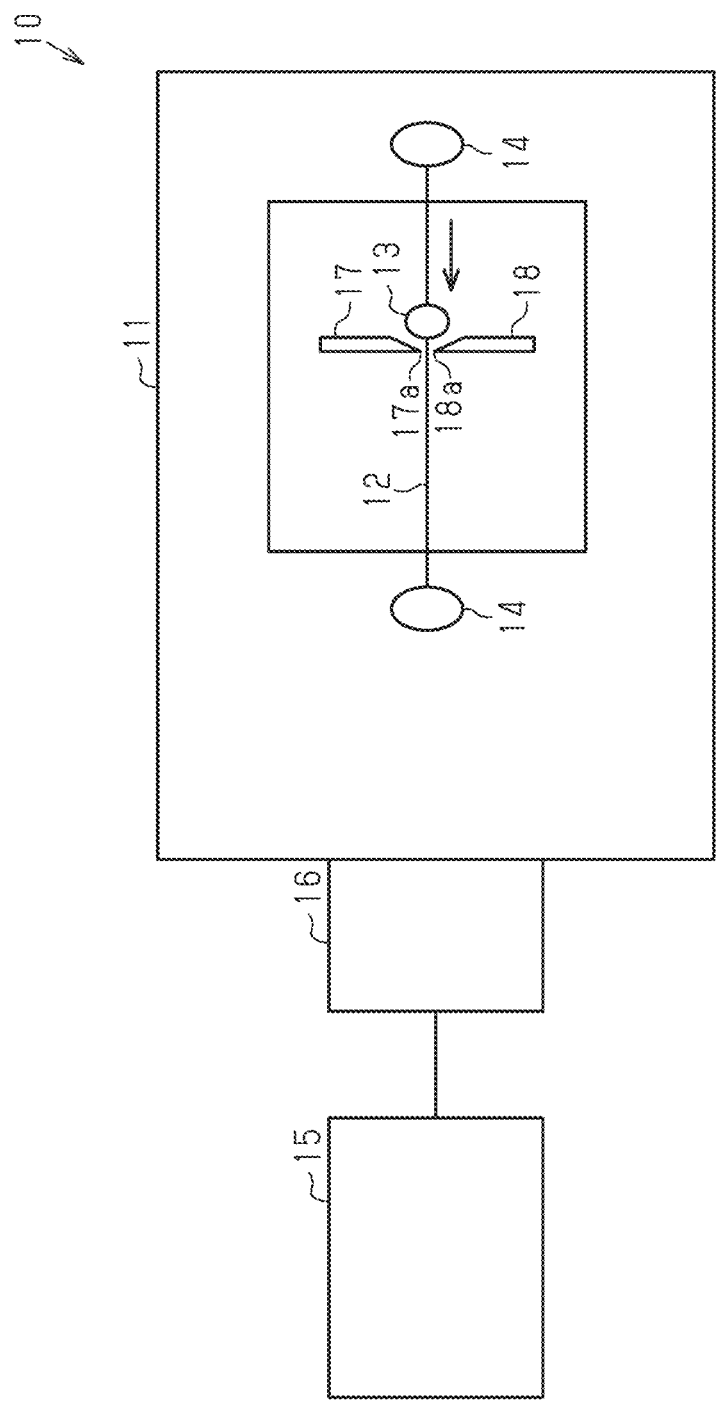

SIZING AGENT FOR INORGANIC FIBERS AND INORGANIC FIBERS

CROSS REFERENCE TO RELATED APPLICATIONS

This Application is a national stage filing under 35 U.S.C. 371 of International Patent Application Serial No PCT/JP2022/044058, filed Nov. 29, 2022, which claims priority to Japanese application number 2021-196189, filed Dec. 2, 2021. The entire contents of these applications are incorporated herein by reference in their entirety.

TECHNICAL FIELD

The present invention relates to an inorganic fiber sizing agent and an inorganic fiber.

BACKGROUND ART

Fiber-reinforced resin composite materials, typically including inorganic fibers, such as carbon fibers, and a matrix resin that acts as a base material, such as a thermosetting resin, are known and widely used in various fields, including construction materials and transportation equipment. In order to improve the adhesion at the interface between the inorganic fibers and the matrix resin, a sizing agent is applied to the inorganic fibers.

For example, a known reinforcing fiber sizing agent is disclosed in Patent Document 1 as an inorganic fiber sizing agent. The inorganic fiber sizing agent of Patent Document 1 contains an exothermic functional group-containing compound and a thermoplastic resin as essential components. In the total nonvolatile content of the inorganic fiber sizing agent, the content of the exothermic functional group-containing compound is 5% to 50% by weight, and the content of the thermoplastic resin is 50% to 95% by weight. A vinyl ester compound is an example of the exothermic functional group-containing compound, and a copolymer polyester resin is an example of the thermoplastic resin.

CITATIONS LIST

Patent Literature

Patent Document 1: Japanese Laid-Open Patent Publication No. 2011-21281

SUMMARY OF INVENTION

Technical Problem

There is a demand for further improvement in the bundling properties of inorganic fibers treated with the conventional inorganic fiber sizing agent. Additionally, there is a need to shorten the curing time in the production of a fiber-reinforced resin composite material by forming the treated inorganic fibers together with a matrix resin and then performing the curing process.

Solution to Problem

An inorganic fiber sizing agent to address the above-mentioned problem contains a resin (A), which includes a vinyl ester resin and an ionic polyester resin, and has a mass ratio of the vinyl ester resin to the ionic polyester resin of greater than 1.

In the inorganic fiber sizing agent, it is preferable for the vinyl ester resin to have at least one selected from the group consisting of a bisphenol A skeleton and a bisphenol F skeleton.

In the inorganic fiber sizing agent, it is preferable for the resin (A) to further include at least one selected from the group consisting of a nonionic polyester resin and an epoxy resin.

In the inorganic fiber sizing agent, it is preferable for the nonionic polyester resin to have at least one selected from the group consisting of a bisphenol A skeleton and a bisphenol F skeleton.

In the inorganic fiber sizing agent, it is preferable for the nonionic polyester resin to have an aliphatic unsaturated bond.

In the inorganic fiber sizing agent, it is preferable for the epoxy resin to have an epoxy group that is bifunctional or higher.

In the inorganic fiber sizing agent, it is preferable for the epoxy resin to have at least one selected from the group consisting of a bisphenol A skeleton and a bisphenol F skeleton.

In the inorganic fiber sizing agent, the resin (A) may further include a nonionic polyester resin and an epoxy resin and in this case, if the sum of the contents of the vinyl ester resin, the ionic polyester resin, the nonionic polyester resin, and the epoxy resin is taken as 100 parts by mass, the inorganic fiber sizing agent preferably contains the vinyl ester resin at a content of greater than or equal to 20 parts by mass and less than or equal to 70 parts by mass, the ionic polyester resin at a content of greater than or equal to 2 parts by mass and less than or equal to 50 parts by mass, the nonionic polyester resin at a content of greater than or equal to 5 parts by mass and less than or equal to 50 parts by mass, and the epoxy resin at a content of greater than or equal to 5 parts by mass and less than or equal to 50 parts by mass.

It is preferable for the inorganic fiber sizing agent to further contain a surfactant.

In the inorganic fiber sizing agent, it is preferable for the surfactant to have an aromatic hydrocarbon group.

In the inorganic fiber sizing agent, if the content of the resin (A) is taken as 100 parts by mass, the inorganic fiber sizing agent preferably contains the surfactant at a content of greater than or equal to 10 parts by mass and less than or equal to 50 parts by mass.

An inorganic fiber to address the above-mentioned problem has the inorganic fiber sizing agent adhered thereto.

Advantageous Effects of Invention

The present invention succeeds in improving the bundling properties of inorganic fibers with the inorganic fiber sizing agent adhered thereto. Additionally, it allows for a reduction in the curing time in the production of a fiber-reinforced resin composite material.

BRIEF DESCRIPTION OF DRAWINGS

FIG. 1 is a schematic view of a composite material interfacial property evaluation equipment used for adhesion evaluations in the Examples section.

DESCRIPTION OF EMBODIMENTS

First Embodiment

A first embodiment that specifically embodies an inorganic fiber sizing agent according to the present invention (hereinafter also referred to as "sizing agent") will now be described.

The sizing agent of the present embodiment contains a resin (A), which includes a vinyl ester resin and an ionic polyester resin, and has a mass ratio of the vinyl ester resin to the ionic polyester resin of greater than 1.

By containing the ionic polyester resin, the sizing agent can improve the bundling properties of inorganic fibers to which the sizing agent is adhered. Additionally, when the mass ratio of the vinyl ester resin to the ionic polyester resin is greater than 1, the curing process of the inorganic fibers to which the sizing agent is adhered and a matrix resin can be completed in a shorter time in the production of a fiber-reinforced resin composite material (hereinafter also referred to as "composite material").

The mass ratio of the vinyl ester resin to the ionic polyester resin is preferably greater than or equal to 1.2. Also, the mass ratio is preferably less than or equal to 20.

(Vinyl Ester Resin)

The vinyl ester resin is a resin containing a vinyl ester compound with a highly reactive double bond such as a vinyl group, acrylate group, and methacrylate group at the terminal of the main chain. The vinyl ester resin may be either an aromatic resin or an aliphatic resin.

Specific examples of the vinyl ester compound include alkyl (meth)acrylic acid esters, alkoxypolyalkylene glycol (meth)acrylic acid esters, benzyl (meth)acrylic acid esters, phenoxyethyl (meth)acrylate, 2-hydroxyalkyl (meth)acrylic acid esters, dialkylaminoethyl (meth)acrylic acid esters, glycidyl (meth)acrylate, 2-methacryloyloxyethyl 2-hydroxypropyl phthalate, polyalkylene glycol di(meth)acrylates, alkanediol di(meth)acrylates, glycerin di(meth)acrylate, 2-hydroxy-3-acryloyloxypropyl (meth)acrylate, dimethylol-tricyclodecane di(meth)acrylate, bisphenol A (meth)acrylic acid ester, alkylene oxide-added bisphenol A (meth)acrylic acid esters, bisphenol A diglycidyl ether (meth)acrylic acid adduct, alkylene oxide-added bisphenol A diglycidyl ether (meth)acrylic acid adducts, trimethylolpropane tri(meth)acrylate, glycidyl (meth)acrylate, phenoxyalkyl (meth)acrylic acid esters, phenoxypolyalkylene glycol (meth)acrylic acid esters, 2-hydroxy-3-phenoxypropanol (meth)acrylic acid ester, polyalkylene glycol nonylphenyl ether (meth)acrylic acid esters, 2-(meth)acryloyloxyethyl succinate, 2-(meth)acryloyloxyethyl phthalate, 2-(meth)acryloyloxyethyl-2-hydroxyethyl phthalate, neopentylglycol (meth)acrylic acid benzoic acid ester, alkylene oxide-added trimethylolpropane tri(meth)acrylates, pentaerythritol tri(meth)acrylic acid ester, pentaerythritol tetra(meth)acrylic acid ester, dipentaerythritol hexa(meth)acrylic acid ester, and pentaerythritol tri(meth)acrylate hexamethylene diisocyanate urethane prepolymer. These vinyl ester compounds may be used alone or in combinations of two or more.

The vinyl ester resin preferably has at least one of a bisphenol A skeleton and a bisphenol F skeleton. Having at least one of a bisphenol A skeleton and a bisphenol F skeleton enhances the impregnation of the matrix resin into a bundle of the inorganic fibers to which the sizing agent is adhered. This enhanced ability of the matrix resin to impregnate is also referred to hereinafter as improved impregnation properties.

(Ionic Polyester Resin)

The ionic polyester resin is a polyester resin having an ionic bond within its molecule.

Examples of an ionic bond within the molecule include cases where a functional group such as a carboxyl group or a sulfo group is present in the polyester resin and ionicallyced to an alkali metal, an amine, ammonium, phosphonium, among others.

Examples of the polyester resin include a linear polyester formed from a diol and a dibasic acid, a lactone ring-opening polymer, and a polyhydroxycarboxylic acid.

Examples of the diol include an alcohol with greater than or equal to 2 carbon atoms and less than or equal to 30 carbon atoms. Specific examples of the diol include ethylene glycol, propylene glycol, butanediol, neopentyl glycol, an aliphatic alkanediol in which an alkylene oxide with greater than or equal to 2 carbon atoms and less than or equal to 4 carbon atoms is added to any of the above diols, an alkylene oxide adduct of a primary alkylamine, such as methylamine, ethylamine, propylamine, octylamine, or dodecylamine, and an alkylene oxide adduct of an aromatic-ring-containing dihydric phenol, such as bisphenol A, bisphenol F, bisphenol S, or cresol.

The above diols may be used alone or in combinations of two or more.

Examples of the dibasic acid include a dicarboxylic acid with greater than or equal to 2 carbon atoms and less than or equal to 24 carbon atoms. Specific examples of the dibasic acid include a saturated aliphatic dicarboxylic acid, such as oxalic acid, malonic acid, succinic acid, adipic acid, or sebacic acid, an unsaturated aliphatic dicarboxylic acid, such as maleic acid or fumaric acid, an aromatic dicarboxylic acid, such as phthalic acid, terephthalic acid, or isophthalic acid, and a dicarboxylic acid anhydride, such as maleic anhydride or phthalic anhydride.

The above dicarboxylic acids may be used alone or in combinations of two or more.

Examples of the lactone ring-opening polymer include a polymer in which monolactone or other lactone with greater than or equal to 3 carbon atoms and less than or equal to 12 carbon atoms is polymerized through ring-opening reactions using a catalyst, such as a metal oxide or an organometallic compound. Specific examples of lactones include β-propiolactone, γ-butyrolactone, δ-valerolactone, and ε-caprolactone.

Specific examples of the polyhydroxycarboxylic acid include those obtained by the dehydration condensation of a hydroxycarboxylic acid, such as glycolic acid or lactic acid.

In the sizing agent, the resin (A) preferably further includes at least one of a nonionic polyester resin and an epoxy resin. More preferably, the resin (A) includes both a nonionic polyester resin and an epoxy resin.

By including the nonionic polyester resin, the resin (A) can improve the fiber opening properties of the inorganic fibers to which the sizing agent is adhered. Additionally, by including the epoxy resin, the resin (A) can improve the adhesion between the inorganic fibers to which the sizing agent is adhered and the matrix resin.

(Nonionic Polyester Resin)

The nonionic polyester resin is a polyester resin that does not have an ionic bond within its molecule. That is, it is a polyester resin that does not contain a functional group such as a carboxyl group or a sulfo group in the resin. Other than the absence of the functional group mentioned above, the same type of polyester resin as that used for the ionic polyester resin described above can be used as the nonionic polyester resin.

The nonionic polyester resin preferably has an acid value of less than or equal to 2.5. From a standpoint of general production techniques, it is assumed that the resin may contain trace amounts of carboxylic acid.

The nonionic polyester resin preferably has at least one of a bisphenol A skeleton and a bisphenol F skeleton.

The nonionic polyester resin preferably has an aliphatic unsaturated bond. The presence of the aliphatic unsaturated bond in the nonionic polyester resin enables a faster curing process.

(Epoxy Resin)

The epoxy resin may be either a monoepoxy resin with one epoxy group in the molecule or a polyfunctional epoxy resin with two or more epoxy groups in the molecule. The polyfunctional epoxy resin can also be referred to as an epoxy resin with bifunctional or higher epoxy groups.

If the epoxy resin is a polyfunctional epoxy resin, it can improve the impregnating properties of the matrix resin with respect to the bundle of the inorganic fibers to which the sizing agent is adhered.

Specific examples of the epoxy resin include bisphenol A type epoxy resins, bisphenol F type epoxy resins, bisphenol S type epoxy resins, phenol-novolac type epoxy resins, cresol-novolac type epoxy resins, alkylphenol-novolac type epoxy resins, biphenyl type epoxy resins, dicyclopentadiene type epoxy resins, naphthalene type epoxy resins, resorcinol diglycidyl ether, polypropylene glycol diglycidyl ether, trimethylolpropane polyglycidyl ether, pentaerythritol polyglycidyl ether, neopentyl glycol diglycidyl ether, 1,6-hexanediol diglycidyl ether, polyethylene glycol diglycidyl ether, digylcerol polyglycidyl ether, polyglycerol polyglycidyl ether, alkyl glycidyl ether, polyoxyalkylene-added alkyl glycidyl ether, phenyl glycidyl ether, polyoxyalkylene-added phenyl glycidyl ether, and an amine type epoxy resin, such as a polymer of triglycidylamine or tetraglycidylamine.

The epoxy resin preferably has at least one of a bisphenol A skeleton and a bisphenol F skeleton.

The contents of the vinyl ester resin, the ionic polyester resin, the nonionic polyester resin, and the epoxy resin in the sizing agent are not particularly limited.

If the sum of the contents of the vinyl ester resin, the ionic polyester resin, the nonionic polyester resin, and the epoxy resin is taken as 100 parts by mass, the sizing agent preferably contains the vinyl ester resin at a content of greater than or equal to 20 parts by mass and less than or equal to 70 parts by mass. Also, the sizing agent preferably contains the ionic polyester resin at a content of greater than or equal to 2 parts by mass and less than or equal to 50 parts by mass, the nonionic polyester resin at a content of greater than or equal to 5 parts by mass and less than or equal to 50 parts by mass, and the epoxy resin at a content of greater than or equal to 5 parts by mass and less than or equal to 50 parts by mass.

The sizing agent preferably further contains a surfactant. By containing the surfactant, the impregnating properties of the matrix resin can be improved.

(Surfactant)

Examples of the surfactant include a nonionic surfactant, an anionic surfactant, a cationic surfactant, and an amphoteric surfactant. These surfactants may be used alone or in combinations of two or more.

(Nonionic Surfactant)

Specific examples of the nonionic surfactant include (1) a compound in which an alkylene oxide with 2 to 4 carbon atoms is added to an organic acid, an organic alcohol, an organic amine, and/or an organic amide, for example, an ether type nonionic surfactant, such as polyoxyethylene dialuric acid ester, polyoxyethylene oleic acid ester, polyoxyethylene oleic acid diester, polyoxyethylene octyl ether, polyoxyethylene lauryl ether, polyoxyethylene lauryl ether methyl ether, polyoxyethylene polyoxypropylene lauryl ether, polyoxypropylene lauryl ether methyl ether, polyoxyethylene oleyl ether, polyoxybutylene oleyl ether, polyoxyethylene polyoxypropylene nonyl ether, polyoxypropylene nonyl ether, polyoxyethylene polyoxypropylene octyl ether, ethylene oxide adduct of 2-hexylhexanaol, polyoxyethylene 2-ethyl-1-hexyl ether, polyoxyethylene isononyl ether, polyoxyethylene dodecyl ether, a compound in which ethylene oxide is added to secondary dodecyl alcohol, polyoxyethylene tridecyl ether, polyoxyalkylene tetradecyl ether, polyoxyethylene lauryl aminoether, polyoxyethylene lauramide ether, or polyoxyalkylene tristyrenated phenyl ether, (2) a polyoxyalkylene polyvalent alcohol fatty acid ester type nonionic surfactant, such as polyoxyalkylene sorbitan trioleate, polyoxyalkylene coconut oil, polyoxyalkylene castor oil, polyoxyalkylene hydrogenated castor oil, polyoxyalkylene hydrogenated castor oil trioctanoate, or maleic acid ester, stearic acid ester, or oleic acid ester of polyoxyalkylene hydrogenated castor oil, (3) an alkyl amide type nonionic surfactant, such as stearic acid diethanolamide or diethanolamine monolauramide, and (4) a polyoxyalkylene fatty acid amide type nonionic surfactant, such as polyoxyethylene diethanolamine monooleylamide, polyoxyethylene laurylamine, or polyoxyethylene beef tallow amine.

(Anionic Surfactant)

Any known anionic surfactant can be appropriately used as the anionic surfactant. Specific examples of the anionic surfactant include (1) a phosphoric acid ester salt of an aliphatic alcohol, such as a lauryl phosphoric acid ester salt, cetyl phosphoric acid ester salt, octyl phosphoric acid ester salt, oleyl phosphoric acid ester salt, or stearyl phosphoric acid ester salt, (2) a phosphoric acid ester salt of an adduct of at least one type of alkylene oxide selected from ethylene oxide and propylene oxide with an aliphatic alcohol, such as a polyoxyethylene lauryl ether phosphoric acid ester salt, polyoxyethylene oleyl ether phosphoric acid ester salt, or polyoxyethylene stearyl ether phosphoric acid ester salt, (3) an aliphatic sulfonic acid salt or aromatic sulfonic acid salt, such as a lauryl sulfonic acid salt, myristyl sulfonic acid salt, cetyl sulfonic acid salt, oleyl sulfonic acid salt, stearyl sulfonic acid salt, tetradecane sulfonic acid salt, dodecylbenzene sulfonic acid salt, or secondary alkyl (C13 to C15) sulfonic acid salt, (4) a sulfuric acid ester salt of an aliphatic alcohol, such as a lauryl sulfuric acid ester salt, oleyl sulfuric acid ester salt, or stearyl sulfuric acid ester salt, (5) a sulfuric acid ester salt of an adduct of at least one type of alkylene oxide selected from ethylene oxide and propylene oxide with an aliphatic alcohol, such as a polyoxyethylene lauryl ether sulfuric acid ester salt, polyoxyalkylene (polyoxyethylene, polyoxypropylene) lauryl ether sulfuric acid ester salt, or polyoxyethylene oleyl ether sulfuric acid ester salt, (6) a sulfuric acid ester salt of a fatty acid, such as castor oil fatty acid sulfuric acid ester salt, sesame oil fatty acid sulfuric acid ester salt, tall oil fatty acid sulfuric acid ester salt, soybean oil fatty acid sulfuric acid ester salt, rapeseed oil fatty acid sulfuric acid ester salt, palm oil fatty acid sulfuric acid ester salt, lard fatty acid sulfuric acid ester salt, beef tallow fatty acid sulfuric acid ester salt, or whale oil fatty acid sulfuric acid ester salt, (7) a sulfuric acid ester salt of an oil or fat, such as a sulfuric acid ester salt of castor oil, sulfuric acid ester salt of sesame oil, sulfuric acid ester salt of tall oil, sulfuric acid ester salt of soybean oil, sulfuric acid ester salt of rapeseed oil, sulfuric acid ester salt of palm oil, sulfuric acid ester salt of lard, sulfuric acid ester salt of beef tallow, or sulfuric acid ester salt of whale oil, (8) a fatty acid salt, such as a lauric acid salt, oleic acid salt, or stearic acid salt, and (9) a sulfosuccinic acid ester salt of an aliphatic alcohol, such as a dioctyl sulfosuccinic acid salt. Examples of a counterion for the anionic surfactant include an alkali metal salt, such as a potassium salt or sodium salt, an ammonium salt, and an alkanolamine salt, such as triethanolamine.

(Cationic Surfactant)

Any known cationic surfactant can be appropriately used as the cationic surfactant. Specific examples of the cationic surfactant include lauryltrimethylammonium chloride, cetyltrimethylammonium chloride, stearyltrimethylammonium chloride, behenyltrimethylammonium chloride, didecyldimethylammonium chloride, 1,2-dimethylimidazole, and triethanolamine.

(Amphoteric Surfactant)

Any known amphoteric surfactant can be appropriately used as the amphoteric surfactant. Specific examples of the amphoteric surfactant include a betaine type amphoteric surfactant.

The surfactant preferably has an aromatic hydrocarbon group. By having the aromatic hydrocarbon group, the impregnating properties of the matrix resin can be further improved.

The content of the surfactant in the sizing agent is not particularly limited.

If the content of the resin (A), which includes the vinyl ester resin and the ionic polyester resin, in the sizing agent is taken as 100 parts by mass, the sizing agent contains the surfactant at a content of preferably greater than or equal to 10 parts by mass and less than or equal to 50 parts by mass, and more preferably greater than or equal to 15 parts by mass and less than or equal to 45 parts by mass.

Second Embodiment

Next, a second embodiment that specifically embodies an inorganic fiber according to the present invention will be described. For the second embodiment, the same arrangements as the first embodiment apply, except for the differences described below. That is, in the following description of the second embodiment, details that are the same as in the first embodiment are omitted.

The inorganic fiber of the present embodiment has the sizing agent of the first embodiment adhered to its surface. A method of producing the inorganic fiber includes applying the sizing agent of the first embodiment to the inorganic fiber. Although there is no particular limit on the amount of sizing agent applied (excluding solvent), it is preferable to apply the sizing agent such that it constitutes greater than or equal to 0.01% by mass and less than or equal to 10% by mass of the inorganic fiber. Specifying such numerical range can further improve the effects such as the bundling properties of inorganic fibers.

(Inorganic Fiber)

As the type of the inorganic fiber used in the present embodiment, there is no particular restriction, and examples thereof include a glass fiber, carbon fiber, ceramic fiber, metal fiber, mineral fiber, rock fiber, and slag fiber. Among these, a glass fiber and a carbon fiber are preferable because they can more effectively express the effects of the present invention. Examples of the type of carbon fiber include a PAN-based carbon fiber made from an acrylic fiber, a pitch-based carbon fiber made from pitch, a recycled carbon fiber, and a carbon fiber made from a material such as a polyester fiber, polyethylene resin, phenol resin, cellulose resin, or lignin resin.

To apply the sizing agent of the first embodiment to the inorganic fiber, any commonly used industrial method is applicable. For example, a roller immersion method, a roller contact method, a spraying method, or a papermaking method can be used. The inorganic fiber to which the sizing agent has been applied can then be dried using a known method.

Third Embodiment

Next, a third embodiment that specifically embodies a composite material according to the present invention will be described. For the third embodiment, the same arrangements as the first and second embodiments apply, except for the differences described below. That is, in the following description of the third embodiment, details that are the same as in the first or the second embodiment are omitted.

The composite material is obtained by impregnating inorganic fibers, to which the sizing agent has been adhered by the second embodiment, with a matrix resin as a base material. There is no particular limit on the form of the inorganic fibers when producing the composite material, and examples thereof include forms such as long fibers, short fibers, and nonwoven fabric.

(Matrix Resin)

The matrix resin is selected appropriately from known materials based on the intended purpose and application of the composite material. Specific examples of the matrix resin include epoxy resins, vinyl ester resins, polyamide resins, polyolefin resins, polyurethane resins, polycarbonate resins, polyester resins, PEEK resins, fluororesins, phenoxy resins, phenol resins, BMI resins, polyimide resins, polyimide resin precursors, and polyether sulfone resins. Among these, a thermosetting resin is preferably used because it expresses adhesion characteristics more effectively.

With the sizing agent and the inorganic fiber of the embodiments, various actions and effects can be achieved, including the following.

(1) The sizing agent contains a vinyl ester resin and an ionic polyester resin, and has a mass ratio of the vinyl ester resin to the ionic polyester resin of greater than 1.

By containing the ionic polyester resin, the sizing agent can improve the bundling properties of inorganic fibers to which the fiber sizing agent is adhered. Additionally, when the mass ratio of the vinyl ester resin to the ionic polyester resin is greater than 1, the curing process in the production of the composite material can be completed in a shorter time.

(2) The vinyl ester resin has at least one of a bisphenol A skeleton and a bisphenol F skeleton. This improves the impregnation properties of the matrix resin.

(3) The inclusion of the nonionic polyester resin in the sizing agent improves the fiber opening properties of the inorganic fibers to which the sizing agent is adhered. Additionally, the inclusion of the epoxy resin in the sizing agent improves the adhesion between the inorganic fibers to which the sizing agent is adhered and the matrix resin.

(4) The nonionic polyester resin has an aliphatic unsaturated bond. This allows the curing process in the production of the composite material to be completed in a shorter time.

(5) The sizing agent contains a surfactant. This improves the impregnation properties of the matrix resin.

(6) The surfactant has an aromatic hydrocarbon group. This further improves the impregnation properties of the matrix resin.

<Modification>

The above-described embodiments can be modified as follows. The above-described embodiments and the following modification can be implemented in combination with each other, provided they are technically consistent.

Within a range that does not impair the effects of the present invention, the sizing agent of the embodiments may further include a stabilizer, an antistatic agent, an electrostatic preventing agent, a binder, an antioxidant, an ultraviolet absorber, an antifoaming agent (silicone compound), a smoothing agent, water, an organic solvent, and other ingredients commonly used in sizing agents for maintaining their quality.

EXAMPLES

Examples will now be provided below to more specifically describe the features and effects of the present invention; however, the present invention is not limited to these examples. In the following description of the working examples and comparative examples, part means part by mass.

Experimental Part 1 (Preparation of Sizing Agents)

Example 1

A sizing agent of Example 1 was prepared by mixing a vinyl ester resin, an ionic polyester resin, a nonionic polyester resin, an epoxy resin, and a surfactant as raw materials in the content proportions indicated in Table 1.

Examples 2 to 15 and Comparative Examples 1 to 4

Sizing agents of Examples 2 to 15 and Comparative Examples 1 to 4 were prepared by mixing the respective ingredients in the content proportions indicated in Table 1.

The types and contents of the vinyl ester resins, the types and contents of the ionic polyester resins, the types and contents of the nonionic polyester resins, the types and contents of the surfactants, and the mass ratios of vinyl ester resin and ionic polyester resin are respectively presented in the "Vinyl ester resin" column, the "Ionic polyester resin" column, the "Nonionic polyester resin" column, the "Surfactant" column, and the "Mass ratio (vinyl ester resin/ionic polyester resin)" column of Table 1.

TABLE 1

| | Resin (A) | | | | | | | | Surfactant | | Inorganic fiber | Evaluation | | | | |
|---|---|---|---|---|---|---|---|---|---|---|---|---|---|---|---|---|
| | Vinyl ester resin | | Ionic polyester resin | | Nonionic polyester resin | | Epoxy resin | | | Parts by mass with respect to 100 parts by mass of resin (A) | Mass ratio (vinyl ester resin/ ionic polyester resin) | | Adhesion | Fiber opening properties | Bundling properties | Curability | Impregnation properties |
| | Type | Parts | Type | Parts | Type | Parts | Type | Parts | Type | | | | | | | | |
| Example 1 | VE-1 | 31.2 | PEI-1 | 6.3 | PE-1 | 31.2 | EP-1 | 31.3 | A-1 | 25 | 5 | Carbon | ◎ | ◎ | ◎ | ◎ | ◎ |
| Example 2 | VE-2 | 33.3 | PEI-1 | 13.3 | PE-2 | 26.8 | EP-1 | 13.3 | A-2 | 33.3 | 2.5 | Carbon | ◎ | ◎ | ◎ | ◎ | ◎ |
| | | | | | | | EP-2 | 13.3 | | | | | | | | | |
| Example 3 | VE-3 | 28.6 | PEI-2 | 7.1 | PE-2 | 7.1 | EP-1 | 42.9 | A-3 | 42.9 | 4 | Carbon | ◎ | ◎ | ◎ | ◎ | ◎ |
| | | | | | | | EP-3 | 14.3 | | | | | | | | | |
| Example 4 | VE-3 | 22.5 | PEI-1 | 18.8 | PE-1 | 28.7 | EP-1 | 17.5 | A-1 | 20 | 1.2 | Glass | ◎ | ◎ | ◎ | ◎ | ◎ |
| | | | | | | | EP-4 | 12.5 | A-2 | 5 | | | | | | | |
| Example 5 | VE-2 | 40 | PEI-1 | 6.7 | PE-2 | 13.3 | EP-1 | 40 | A-2 | 33.3 | 6 | Carbon | ◎ | ◎ | ◎ | ◎ | ◎ |
| Example 6 | VE-1 | 28.6 | PEI-1 | 7.1 | PE-2 | 35.8 | EP-1 | 7.1 | A-2 | 12.9 | 4 | Carbon | ◎ | ◎ | ◎ | ◎ | ◎ |
| | | | | | | | EP-2 | 21.4 | A-3 | 30 | | | | | | | |
| Example 7 | VE-1 | 47.1 | PEI-3 | 17.6 | PE-1 | 29.4 | EP-1 | 5.9 | A-1 | 17.6 | 2.7 | Carbon | ◎ | ◎ | ◎ | ◎ | ◎ |
| Example 8 | VE-4 | 26.7 | PEI-1 | 6.7 | PE-3 | 40 | EP-1 | 13.3 | A-3 | 33.3 | 4 | Carbon | ◎ | ◎ | ◎ | ○ | ◎ |
| | | | | | | | EP-3 | 13.3 | | | | | | | | | |
| Example 9 | VE-1 | 47.1 | PEI-2 | 17.6 | PE-1 | 29.4 | EP-5 | 5.9 | A-1 | 17.6 | 2.7 | Carbon | ◎ | ◎ | ◎ | ◎ | ○ |
| Example 10 | VE-5 | 26.7 | PEI-1 | 6.7 | PE-2 | 26.6 | EP-1 | 40 | A-2 | 33.3 | 4 | Carbon | ◎ | ◎ | ◎ | ◎ | ○ |
| Example 11 | VE-1 | 28.6 | PEI-1 | 14.3 | PE-3 | 28.6 | EP-2 | 28.5 | A-4 | 42.9 | 2 | Carbon | ◎ | ◎ | ◎ | ○ | ○ |
| Example 12 | VE-2 | 33.3 | PEI-1 | 13.3 | — | 0 | EP-1 | 53.4 | A-1 | 33.3 | 2.5 | Carbon | ◎ | ○ | ◎ | ○ | ◎ |
| Example 13 | VE-1 | 69.3 | PEI-1 | 4 | PE-3 | 26.7 | — | 0 | A-5 | 20 | 17.3 | Glass | ○ | ◎ | ○ | ○ | ○ |
| | | | | | | | | | A-6 | 13.3 | | | | | | | |
| Example 14 | VE-2 | 62.5 | PEI-3 | 37.5 | — | 0 | — | 0 | A-2 | 25 | 1.7 | Carbon | ○ | ○ | ○ | ○ | ◎ |
| Example 15 | VE-2 | 55 | PEI-1 | 45 | — | 0 | — | 0 | — | 0 | 1.2 | Carbon | ○ | ○ | ○ | ○ | ○ |
| Comparative example 1 | VE-2 | 13.3 | — | 0 | PE-2 | 60 | EP-1 | 26.7 | A-3 | 33.3 | — | Carbon | ◎ | ◎ | X | ◎ | ◎ |
| Comparative example 2 | — | 0 | PEI-1 | 13.3 | PE-1 | 26.7 | EP-1 | 60 | A-1 | 33.3 | — | Glass | X | X | ◎ | X | ○ |

TABLE 1-continued

| | Resin (A) | | | | | | | | | Surfactant Parts by mass with respect to 100 parts by mass of resin (A) | Mass ratio (vinyl ester resin/ ionic polyester resin) | Inorganic fiber | Evaluation | | | | |
|---|---|---|---|---|---|---|---|---|---|---|---|---|---|---|---|---|---|
| | Vinyl ester resin | | Ionic polyester resin | | Nonionic polyester resin | | Epoxy resin | | | | | | Adhesion | Fiber opening properties | Bundling properties | Curability | Impregnation properties |
| | Type | Parts | Type | Parts | Type | Parts | Type | Parts | Type | | | | | | | | |
| Comparative example 3 | VE-1 | 57.1 | — | 0 | — | 0 | EP-1 | 42.9 | A-1 | 42.9 | — | Carbon | ◎ | ○ | X | ○ | ◎ |
| Comparative example 4 | VE-1 | 10 | PEI-1 | 70 | — | 0 | EP-1 | 20 | — | 0 | 0.1 | Carbon | ◎ | X | ◎ | X | ○ |

In Table 1, the mass ratios of vinyl ester resin and ionic polyester resin can be calculated from the mixing proportions of both ingredients. Additionally, a sizing agent adhered to inorganic fibers can be identified by extracting it with a solvent such as acetone, and subsequently using analytical methods such as proton nuclear magnetic resonance (also called H-NMR) and fluorescent X-ray analysis.

Details of the resins (A) listed in Table 1 are indicated in Table 2. The types and structures of the vinyl ester resins, the ionic polyester resins, the nonionic polyester resins, and the epoxy resins are respectively presented in the "Type" column and the "Structure" column.

TABLE 2

| Resin (A) | Type | Structure |
|---|---|---|
| Epoxy resin | EP-1 | jER828 (bisphenol A based bifunctional epoxy resin) |
| | EP-2 | jER1001 (bisphenol A based bifunctional epoxy resin) |
| | EP-3 | jER1002 (bisphenol A based bifunctional epoxy resin) |
| | EP-4 | jER1004 (bisphenol A based bifunctional epoxy resin) |
| | EP-5 | Denacol EX-421 (diglycerol polyglycidyl ether) |
| Vinyl ester resin | VE-1 | Vinyl ester resin obtained by complete esterification with jER828 and methacrylic acid being charged such that the epoxy value and the acid value are equimolar |
| | VE-2 | Vinyl ester resin obtained by esterification with jER828 and methacrylic acid being charged such that on the basis of the epoxy value and the acid value, the acid value is 10% greater |
| | VE-3 | Vinyl ester resin obtained by complete esterification with jER834 and methacrylic acid being charged such that the epoxy value and the acid value are equimolar |
| | VE-4 | Vinyl ester resin obtained by complete esterification with Newpol BPE-20 and methacrylic acid being charged such that the hydroxyl value and the acid value are equimolar |
| | VE-5 | Vinyl ester resin obtained by complete esterification with trimethylolpropane and methacrylic acid being charged such that the hydroxyl value and the acid value are equimolar |
| Ionic polyester resin | PEI-1 | Polyester resin in which<br>Constituent unit formed from sodium 5-sulfoisophthalate: 4% by mol<br>Constituent unit formed from isophthalic acid: 46% by mol<br>Constituent unit formed from diethylene glycol: 50% by mol (total 100% by mol)<br>Number average molecular weight: 10000 |
| | PEI-2 | Polyester resin in which<br>Constituent unit formed from sodium 5-sulfoisophthalate: 3% by mol<br>Constituent unit formed from isophthalic acid: 17% by mol<br>Constituent unit formed from terephthalic acid: 30% by mol<br>Constituent unit formed from ethylene glycol: 20% by mol<br>Constituent unit formed from diethylene glycol: 30% by mol (total 100% by mol)<br>Number average molecular weight: 15000 |
| | PEI-3 | Resin obtained by neutralizing, by triethanolamine, a polyester resin obtained by esterification with Newpol BPE-100 and maleic acid being charged such that the hydroxyl value/acid value = 4/5 in molar ratio |
| Nonionic polyester resin | PE-1 | Polyester resin obtained by esterification with Newpol BPE-20 and fumaric acid being charged such that the hydroxyl value/acid value = 4/3 in molar ratio |
| | PE-2 | Polyester resin obtained by esterification with Newpol BPE-40 and maleic acid being charged such that the hydroxyl value/acid value = 5/4 in molar ratio |
| | PE-3 | Polyester resin obtained by esterification with Newpol BPE-100 and adipic acid being charged such that the hydroxyl value/acid value = 6/6 in molar ratio |

In Table 2, the epoxy resins EP-1 to EP-4 (jER 828 (registered trademark), jER 1001 (registered trademark), jER 1002 (registered trademark), and jER 1004 (registered trademark)) are produced by Mitsubishi Chemical Corporation and have bifunctional epoxy groups. EP-5 (Deconal (registered trademark) EX-421) is produced by Nagase Chemtex Corporation and has polyfunctional epoxy groups.

Newpol (registered trademark) BPE-20, Newpol (registered trademark) BPE-40, and Newpol (registered trademark) BPE-100 are polyester resins produced by Sanyo Chemical Industries, Ltd.

The epoxy resins EP-1 to EP-4, the vinyl ester resins VE-1 to VE-4, and the nonionic polyester resins PE-1 to PE-3 all have a bisphenol A skeleton.

The nonionic polyester resins PE-1 and PE-2 each have an aliphatic unsaturated bond.

Details of the surfactants listed in Table 1 are indicated in Table 3. The structures of the surfactants are presented in the "Structure" column. The presence or absence of an aromatic hydrocarbon group is presented in the "With or without aromatic hydrocarbon group" column.

properties, bundling properties, curability, and impregnating properties of the inorganic fibers to which the sizing agents were adhered. The procedures of the respective tests are described below. Additionally, the results of these evaluation are presented in the "Adhesion," "Fiber opening properties," "Bundling properties," "Curability," and "Impregnation properties" columns of Table 1.

(Adhesion)

The adhesion was evaluated by measuring stress using a micro-droplet method with commercially available composite material interfacial property evaluation equipment. FIG. 1 shows a schematic view of the composite material interfacial property evaluation equipment 10.

In Experimental Part 2, a single carbon fiber 12 was taken out from a bundle of carbon fibers with the sizing agent adhered, and both ends of the carbon fiber 12, while in a tensioned state, were fixed with an adhesive agent 14 to a plate-like quadrilateral frame-shaped holder 11.

Next, a matrix resin mixed in a ratio of epoxy resin (epoxy equivalent: 190; tradename: jER828, produced by Mitsubishi Chemical Corporation) to BF3 monoethylamine salt

TABLE 3

| Surfactant | Structure | With or without aromatic hydrocarbon group |
| --- | --- | --- |
| A-1 | Compound with 31 moles of ethylene oxide and 4 moles of propylene oxide randomly added to tristyrenated phenol | Presence |
| A-2 | Compound with 27 moles of ethylene oxide and 3 moles of propylene oxide randomly added to distyrenated phenol | Presence |
| A-3 | Compound with 17 moles of ethylene oxide added to tristyrenated phenol | Presence |
| A-4 | Compound with 9 moles of ethylene oxide added to dodecyl alcohol | Absence |
| A-5 | Compound with 6 moles of ethylene oxide and 2 moles of propylene oxide randomly added to isononanol | Absence |
| A-6 | Compound with 15 moles of ethylene oxide added to dodecylamine | Absence |

Experimental Part 2 (Sizing of Inorganic Fibers and Preparation of Composite Materials)

The sizing agent of each example prepared in Experimental Part 1 was diluted with water to prepare an aqueous solution with a solid content of 2% and was placed in a treatment bath. Unsized carbon fibers (tensile strength: 3500 MPa; tensile elasticity: $2.3 \times 10^5$ MPa; 12000 filaments) obtained from polyacrylonitrile-based fibers were continuously immersed in the treatment bath, and the sizing agent was applied by adjusting a wringing condition of rollers such that the amount of the sizing agent adhered (excluding solvent) was consistently 2% of the carbon fibers. The same method was used to apply the sizing agent to glass fibers.

Strand form fiber bundles of the carbon fibers or glass fibers, to which the sizing agent was adhered, were opened by conveying through rollers. The opened fiber bundles were then passed through a resin tank containing a vinyl ester resin, used as a matrix resin, to be impregnated with the vinyl ester resin. The vinyl ester resin used was Ripoxy (registered trademark) R-804B, produced by Showa Denko K. K. (using a methyl ethyl ketone peroxide curing agent produced by the same company). After impregnation with the vinyl ester resin, pultrusion molding was performed by passing through a curing die of 1 m length set to 140° C. to prepare a composite material. During the pultrusion molding, the sizing agent was cured together with the matrix resin.

Experimental Part 3 (Evaluation)

The sizing agents of Examples 1 to 15 and Comparative Examples 1 to 4 were evaluated for adhesion, fiber opening (tradename: boron trifluoride monoethylamine, produced by Stella Chemifa Corporation)=100/3 (mass ratio) was applied to the carbon fiber 12 to form a resin droplet 13 with a diameter of approximately 70 m and then cured by heating for 90 minutes at 160° C. in an air atmosphere.

Additionally, apart from the evaluation using the aforementioned epoxy resin, a vinyl ester resin (tradename: Ripoxy (registered trademark) R-804B, produced by Showa Denko K. K. (using a methyl ethyl ketone peroxide curing agent produced by the same company)) was applied to the carbon fiber 12 to form a resin droplet 13 with a diameter of approximately 70 μm and then cured by heating for 20 minutes at 160° C. in an air atmosphere.

In an equipment main body not shown in the drawing, two plate-shaped blades 17 and 18, each with one side formed into a tapered vertical cross-section, are mounted in such a position that their tip portions 17a and 18a face each other. The holder 11, which secures the carbon fiber 12 with the resin droplet 13, was mounted on a base plate 16, which is fixed to the equipment main body, at a position where the carbon fiber 12 is sandwiched between the tip portions 17a and 18a of the two blades 17 and 18. A load cell 15 is connected to the base plate 16 to measure the stress applied to the base plate 16. The maximum stress F that occurs when the resin droplet 13 is peeled off from the carbon fiber 12 by the tip portions 17a and 18a of the blades 17 and 18 as the holder 11 moves along the fiber axis at a speed of 5 mm/minute was measured by the load cell 15.

Using the measured values, the interfacial shear strength τ was calculated according to Numerical Formula 1 shown below. This procedure was repeated 20 times to determine the average value of the interfacial shear strength.

With a reference value for the maximum stress of the epoxy resin set at 60 MPa and that of the vinyl ester resin set at 40 MPa, adhesion was evaluated based on the criteria indicated below, using the increase rate of the average value relative to these reference values. The same test was also conducted using glass fibers. The results of the evaluations are shown in the "Adhesion" column of Table 1.

$$\tau = F/\pi DL \qquad \text{[Numerical Formula 1]}$$

In Numerical Formula 1,
F represents the maximum stress (N) that occurs when the resin droplet 13 peels off from the carbon fiber 12,
D represents the diameter (m) of the carbon fiber 12, and
L represents the diameter (m) along the direction of extraction of the resin droplet 13.

Evaluation Criteria of Adhesion
- ⊚ (good): For both the carbon and glass fibers, the increase rates were greater than or equal to 5% for both the epoxy resin and the vinyl ester resin.
- ○ (acceptable): For both the carbon and glass fibers, the increase rate was greater than or equal to 5% for either the epoxy resin or the vinyl ester resin.
- x (poor): For both the carbon and glass fibers, the increase rates were less than 5% for both the epoxy resin and the vinyl ester resin.

(Fiber opening properties)

For the carbon and glass fibers opened by conveying through rollers in Experimental Part 2, the states of the opened fibers were visually observed. Evaluation was performed based on the criteria indicated below.

Evaluation Criteria of Fiber Opening Properties
- ⊚ (good): There were no gaps between fiber bundles after fiber opening, and the fibers were opened uniformly.
- ○ (acceptable): Although gaps were seen in some parts between fiber bundles after fiber opening, the gaps were not problematic for practical use, and the fibers were opened substantially uniformly.
- x (poor): There were many gaps between fiber bundles after fiber opening, and the gaps were problematic for practical use.

(Bundling Properties)

For the carbon and glass fibers opened by conveying through rollers in Experimental Part 2, the rollers that the carbon and glass fibers passed through were visually observed. Evaluation was performed based on the criteria indicated below.

Evaluation Criteria of Bundling Properties
- ⊚ (good): Almost no fibers were seen wound around the rollers.
- ○ (acceptable): Only a few fibers were seen wound around the rollers, but not enough to impede operation.
- x (poor): Many fibers were seen wound around the rollers, impeding operation.

(Curability)

The carbon fibers with the sizing agent adhered thereto were impregnated with the vinyl ester resin, and the curability of the composite material was evaluated by performing pultrusion molding at varying times through a curing die set at 140° C. and 1 m in length. The test was also conducted in the same manner on glass fibers, and evaluation was performed based on criteria indicated below. In evaluating curability, sufficient curability was determined if pressing the surface of the composite material with a finger showed no elasticity or denting.

Evaluation Criteria of Curability
- ⊚ (good): Exhibited sufficient curability for those that passed through the curing die in 5 minutes.
- ○ (acceptable): Exhibited sufficient curability for those that passed through the curing die in 6 minutes.
- x (poor): Did not exhibit sufficient curability for those that passed through the curing die in 6 minutes.

(Impregnation Properties)

In Experimental Part 2, strand form fiber bundles of the carbon fibers and glass fibers, to which the sizing agent was adhered, were opened to a width of 1 cm using a chromed textured pin with a diameter of 1 cm as a fiber opening bar. 0.06 g of vinyl ester resin (tradename: Ripoxy (registered trademark) R-804B, produced by Showa Denko K. K.) as a matrix resin was dripped onto the carbon fiber bundles and the glass fiber bundles in an atmosphere of 25° C., and the maximum diameter of the vinyl ester resin at 60 seconds after dripping was measured.

Upon changing the matrix resin to an epoxy resin (epoxy equivalent: 190; tradename: jER828 (registered trademark), produced by Mitsubishi Chemical Corporation), the maximum diameter of the epoxy resin 60 seconds after dripping was measured, following the same procedure as described above. Based on these measurement results, the impregnating properties of the matrix resin were evaluated based on the criteria indicated below.

Evaluation Criteria of Impregnating Properties
- ⊚ (good): The maximum diameters of both the epoxy resin and the vinyl ester resin were greater than or equal to 5.5 mm.
- ○ (acceptable): The maximum diameter of either the epoxy resin or the vinyl ester resin was greater than or equal to 5.5 mm.
- x (poor): The maximum diameters of both the epoxy resin and the vinyl ester resin were less than 5.5 mm.

According to the results of Table 1, the present invention improves the bundling properties of inorganic fibers with the inorganic fiber sizing agent adhered thereto. Additionally, it allows for a reduction in the curing time in the production of the fiber-reinforced resin composite material.

REFERENCE SIGNS LIST

10 . . . composite material interfacial property evaluation equipment
11 . . . holder
12 . . . carbon fiber
13 . . . resin droplet
14 . . . adhesive agent
15 . . . load cell
16 . . . base plate
17, 18 . . . blade

The invention claimed is:

1. An inorganic fiber sizing agent comprising a resin (A), which includes a vinyl ester resin, a nonionic polyester resin and an ionic polyester resin, and has a mass ratio of the vinyl ester resin to the ionic polyester resin of greater than 1.

2. The inorganic fiber sizing agent according to claim 1, wherein the vinyl ester resin has at least one selected from the group consisting of a bisphenol A skeleton and a bisphenol F skeleton.

3. The inorganic fiber sizing agent according to claim 1, wherein the resin (A) further includes an epoxy resin.

4. The inorganic fiber sizing agent according to claim 3, wherein the epoxy resin has an epoxy group that is bifunctional or higher.

5. The inorganic fiber sizing agent according to claim 3, wherein the epoxy resin has at least one selected from the group consisting of a bisphenol A skeleton and a bisphenol F skeleton.

6. The inorganic fiber sizing agent according to claim 1, wherein the nonionic polyester resin has at least one selected from the group consisting of a bisphenol A skeleton and a bisphenol F skeleton.

7. The inorganic fiber sizing agent according to claim 1, wherein the nonionic polyester resin has an aliphatic unsaturated bond.

8. The inorganic fiber sizing agent according to claim 1, wherein the resin (A) further includes an epoxy resin, and, if the sum of the contents of the vinyl ester resin, the ionic polyester resin, the nonionic polyester resin, and the epoxy resin is taken as 100 parts by mass, the inorganic fiber sizing agent contains the vinyl ester resin at a content of greater than or equal to 20 parts by mass and less than or equal to 70 parts by mass, the ionic polyester resin at content of greater than or equal to 2 parts by mass and less than or equal to 50 parts by mass, the nonionic polyester resin at content of greater than or equal to 5 parts by mass and less than or equal to 50 parts by mass, and the epoxy resin at content of greater than or equal to 5 parts by mass and less than or equal to 50 parts by mass.

9. The inorganic fiber sizing agent according to claim 1, further comprising a surfactant.

10. The inorganic fiber sizing agent according to claim 9, wherein the surfactant has an aromatic hydrocarbon group.

11. The inorganic fiber sizing agent according to claim 9, wherein if the content of the resin (A) is taken as 100 parts by mass, the inorganic fiber sizing agent contains the surfactant at a content of greater than or equal to 10 parts by mass and less than or equal to 50 parts by mass.

12. An inorganic fiber to which the inorganic fiber sizing agent according to claim 1 is adhered.

* * * * *